United States Patent

[11] 3,572,477

[72] Inventor James M. Ewart
Nanimo, British Columbia, Canada
[21] Appl. No. 778,733
[22] Filed Nov. 25, 1968
[45] Patented Mar. 30, 1971
[73] Assignee S. Madill Ltd.,
Nanaimo, British Columbia, Canada

[54] LIQUID COOLED BRAKE
1 Claim, 6 Drawing Figs.
[52] U.S. Cl. .................................................. 188/264, 192/113
[51] Int. Cl. ..................................................... F16d 65/84
[50] Field of Search ............................................ 188/264.2, .25, (CC); 192/113, 113.2

[56] References Cited
UNITED STATES PATENTS
1,786,285 12/1930 Bissell .................... (188/264.CC)UX
2,911,071 11/1959 Gelleke ................... (188/264.2)UX
2,986,239 5/1961 Sanford ...................... 188/264(.2)
3,028,935 4/1962 Gold et al. .................. 188/264(.2)
FOREIGN PATENTS
778,336 7/1957 Great Britain ............... 188/264(CC)

Primary Examiner—George E. A. Halvosa
Attorney—Lyle G. Trorey

ABSTRACT: A Liquid Cooled Brake wherein a steel wear plate adapted to be engaged by a frictional element forms one wall of the chamber through which a liquid coolant is passed. Copper fins in the chamber and in intimate contact with the wear plate transfer heat from the latter to the liquid coolant.

Patented March 30, 1971

James M. Ewart,
Inventor by Lyle G. Torey,
Agent

Patented March 30, 1971 3,572,477

James M. Ewart,
Inventor by Lyle O. Trorey,
Agent

LIQUID COOLED BRAKE

BACKGROUND OF THE INVENTION

This invention relates to friction brakes and in particular to liquid cooled brakes.

The development of liquid cooled brakes has been largely due to the development of high powered equipment such as yarders and the like used in the logging industry and like industries wherein the nature of the work necessitates prolonged application of brakes. The brakes employed for this purpose usually include a smooth metallic wear plate which is maintained in nonrotative relationship to the frame of the yarder and which is frictionally engaged by a friction or rubbing member that is nonrotatably connected to the part to be braked. Unless the heat generated by the frictional engagement of the wear plate by the friction member can be dissipated quickly the friction member, which is commonly made of a fibrous inert material such as asbestos, is soon damaged and necessitates repair or replacement.

Liquid cooled brakes of this type are generally constructed so that the wear plate forms one wall of a chamber through which a coolant, under a slight pressure, is passed. The thermoconductiveness of the wear plate and the surface area of the latter in contact with the coolant largely determines the effectiveness of the brake relative to the dissipation of heat through the wear plate. It is therefore, the practice to employ wear plates which are made of steel or copper, two metals which have a relatively high coefficient of thermal conductivity and to provide the surface of the plate wetted by the coolant with fins so as to increase the heat transfer surface thereof. Of the two metals, that is copper or steel, copper is much the superior metal in respect of thermal conductivity however copper has one major drawback in that it is relatively soft. Consequently, to avoid excessive wear of a copper wear plate a relatively soft friction or rubbing member must be used. This seriously limits choice of materials used in the friction or rubbing member as it is advisable to prevent excessive wear of the wear plate.

A steel wear plate, on the other hand, although having a much lower coefficient of thermoconductivity than copper plate is much harder than the latter and therefore permits a wider selection of linings which may be or have better frictional characteristics. The advantage obtained by a better selection of linings, however, is largely cancelled by the relatively poor heat transmitting capabilities of steel.

Users of present liquid cool brakes are therefore faced with a choice of employing a brake in which heat can be dissipated very readily but which uses a lining which is subject to rapid wear, or of using a brake having a better lining material but which does not dissipate heat as quickly.

SUMMARY OF THE INVENTION

The present invention provides a liquid cooled brake wherein copper and steel are used in the fabrication of wear plates in such a manner that the wear resistant qualities of steel and the thermoconductive qualities of copper are utilized to the best advantage.

The liquid cooled brake of the present invention is formed so as to present a steel face to the friction or rubbing member and copper fins to the liquid coolant. The choice of lining is therefore not as limited as it would be if the wear plate was composed entirely of copper yet the thermoconductiveness of the plate is greater than if the plate were made entirely of steel.

The present invention, provides a liquid cooled brake wherein the copper and steel forming the wear plate fins are connected in such an intimate manner the wear plate is substantially of integral construction so that the transfer of heat from the steel section of the wear plate through the copper fins and into the liquid follows an uninterrupted metallic path.

The present invention, also, provides a liquid cooled brake in which the fins are supported against pressure applied to the wear plate thereby permitting the wear plate to be relatively thin thereby enhancing the rate of heat flow therethrough.

The liquid cooled brake of the present invention includes a chamber arranged for passage of a liquid coolant therethrough, a nonrotatable steel wear plate forming one wall of said chamber a friction member drivingly connected to a member to be braked and moveable into and out of frictional engagement with the wear plate, and copper fins in the chamber having an intimate soldered connection with the wear plate for transferring heat from the wear plate to the liquid coolant.

DESCRIPTION OF PREFERRED EMBODIMENT

Figure 1:
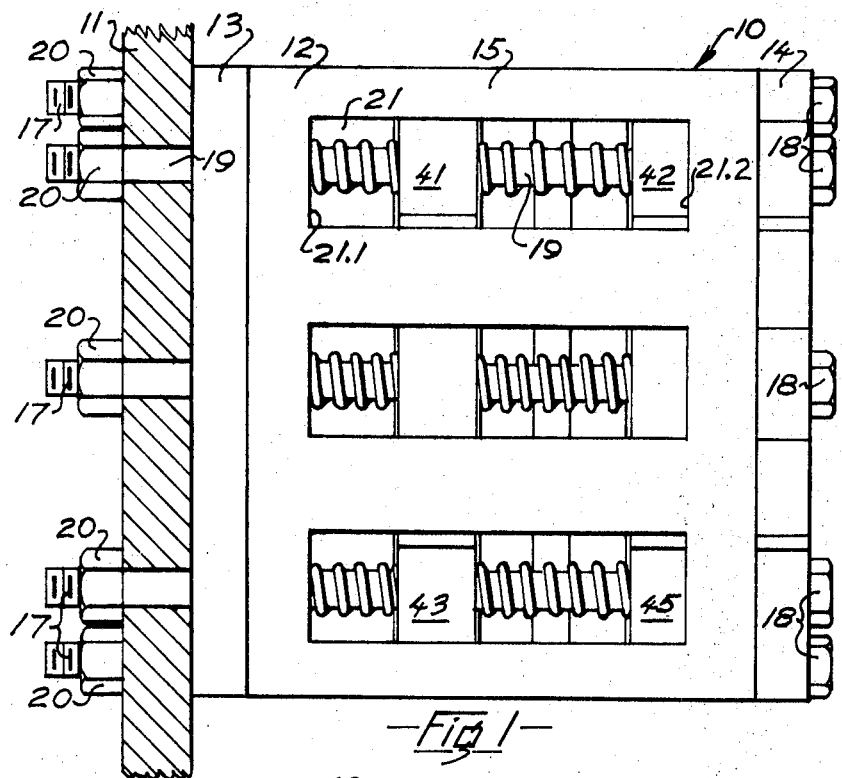
FIG. 1 is a side elevation of the liquid cooled brake of the present invention.
Figure 2:
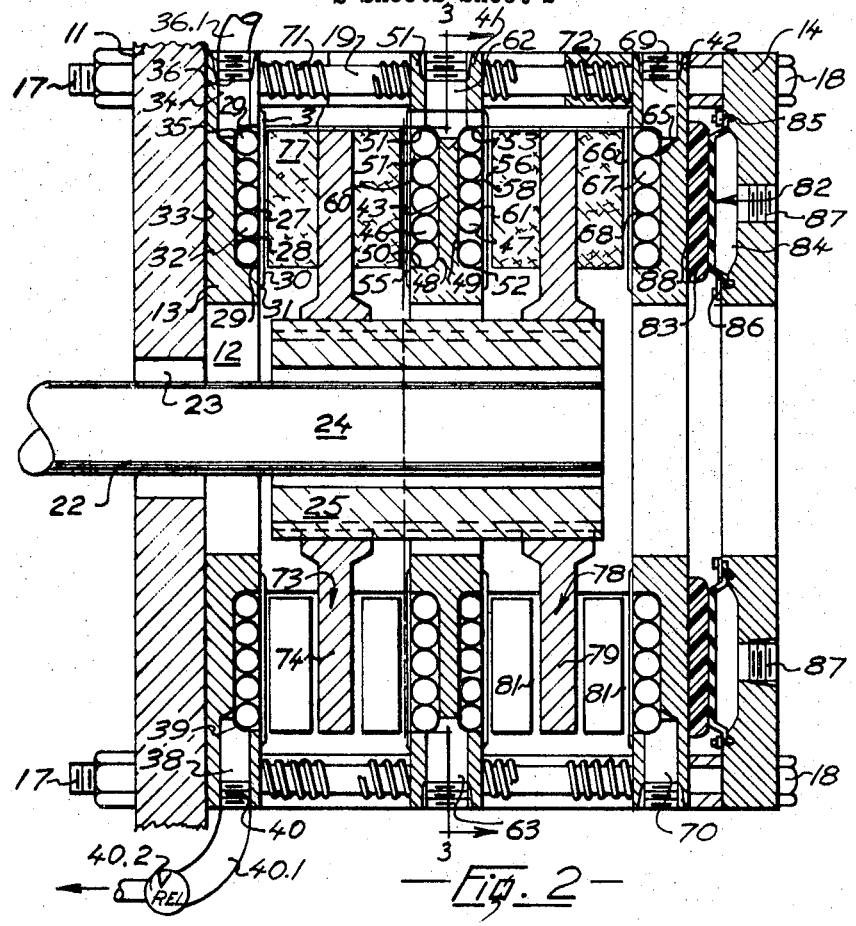
FIG. 2 is appearing on page 2 of the drawings is a central side sectional view of the liquid cooled brake of FIG. 1.

Referring to the drawings in particular to FIGS. 1 and 2 thereof there is illustrated a liquid cooled disc type brake 10 connected to a side frame 11 of a yarder or the like, not shown.

The brake includes a supporting structure in the form of a housing 12 formed of a pair of annular end plates 13 and 14 fitted against the opposite ends of an elongated hollow cylindrical section 15.

Bolts 17 having heads 18 and elongated shafts 19 are slidably extended through suitable holes through both end plates 13 and 14 and suitably located passages, not shown, extending longitudinally of the cylindrical section 15 through the walls thereof. These bolts are extended through suitably located holes in the side frame 11 and are provided with nuts 20 by means of which the entire housing 12 can be nonrotatably connected to said side frame 11. The walls of the cylindrical section 15 are provided with elongated longitudinally extending openings 21 having end walls 21.1 and 21.2 positioned so that a major length of shafts 19 of the bolts 17 are exposed.

The housing 12 is positioned over, and in coaxial relationship with, a shaft 22 which can be a jack shaft or a shaft operably connected to a yarder drum or the like, not shown, and which is rotatably journaled in bearings 23 mounted on said side frame 11. The shaft has an outer end portion 24 projecting outwardly of the side frame 11 into the housing 12. This outer end portion 24 of the shaft is provided with an elongated, longitudinally-splined hub 25 which is nonrotatably secured thereon as by a key arrangement 26.

On the inside side surface of end plate 13 is machined or otherwise formed, a wide annular groove 27 having a flat annular bottom face 28 and sidewalls 29 extending substantially normal to said bottom face 28. The annular groove is covered by an annular steel wear plate 30 which is bolted or welded at its inner and outer edges as at 31 to the inside surface of said end plate 13 so as to form annular chamber 32. The wear plate 30 has secured thereto copper fins 33 arranged, in a manner hereinafter to be described, and substantially filling the chamber 32.

The end plate 13 is provided with a radially extending bore 34 ported at one end 35 into the chamber 32 and internally threaded at its other end 36 for suitable connection to a feed line 36.1 which is connected to a suitable source of pressurized liquid coolant such as cold water. End plate 13 is also provided with a radial bore 38 spaced in diametric opposition to bore 34 which is ported at one end 39 into the chamber 32 and is internally threaded at its other end 40 for connection to an outfeed line 40.1 through which the coolant flows out of the chamber. The outfeed line can be provided with an adjustable spring loaded check valve 40.2 so that the liquid coolant within the chamber 32 may be maintained at a few pounds above atmospheric pressure.

Supported on the exposed portions of the bolt shafts 19 are a pair of sliding plates 41 and 42. Plate 41 (refer to FIG. 3) has an outside diameter slightly less than the inside diameter of the cylindrical section 15 so as to be axially slidable therein and is provided with radially extending lugs 43 which slidably extend through the opening 21. These lugs are provided with circular apertures 44 through which the shafts 19 of the bolts 17 slidably extend. Sliding plate 42 has also an outside diameter slightly less than the inside diameter of tee cylindrical section 15 so as to be axially slidable therein and is, like sliding plate 41, provided with lugs 45 suitably apertured to provide a longitudinally sliding connection with the shafts 19 of the bolts.

Sliding plate 41 is provided, on opposite side surfaces thereof, with annular grooves 46 and 47 having bottoms 48 and 49, respectively, and annular sidewalls 50, 51 and 52, 53, respectively.

Grooves 46 and 47 are also covered by steel wear plates 55 and 56, respectively, so as to form chambers 57 and 58, respectively. Steel wear plates 55 and 56 are provided with copper fins 60 and 61 respectively which lie in the chambers 57 and 58. Sliding plate 41 is provided with radial bores 62 and 63 corresponding to radial bores 34 and 38 respectively which are ported into both chambers 57 and 58 and which are suitably threaded to provide connection with the liquid infeed conduits not shown and liquid outfeed conduit shown as previously described with reference to end plate 13.

Sliding plate 42 like end plate 13 is provided on its inner surface with an annular groove 65 on which a steel wear plate 66 is secured to form an annular chamber 67 in which are situated copper fins 68 connected to said steel wear plate 66. Sliding plate 42 is provided with a pair of diametrically opposed radial bores 69 and 70 which have a connection to liquid coolant infeed and outfeed lines similar to end plate 13.

Compression springs 71 are fitted over the shafts 19 of the bolts 17 between plate 41 and the end walls 21.1 of the openings 21 and similar compression springs 72 are fitted over the shafts 19 of the bolts 17 between sliding plate 41 and sliding plate 42 so as to normally urge both sliding plates away from each other and away from end plate 13.

Interposed between end plate 13 and sliding plate 41 is a friction or rubbing member 73. Member 73 is formed of a flat annular carrying disc 74 preferably of steel composition which has a longitudinally slidable, splined connection with the hub 25. On opposite sides of the carrying disc 74 are secured annular brake linings 77. These brake linings are arranged so that they confront wear plates 30 and 55, and are made of known fibrous materials containing a high percentage of asbestos fibers. The linings are either bolted or bonded to disc 74.

A friction member 78 indentical to friction member 73 and having an annular carrying disc 79 and the brake linings 81 is interposed between sliding plates 41 and 42 in confronting relationship to wear plates 56 and 66. Friction member 78 also has a longitudinally slidable, nonrotatable, splined connection with hub 25.

The linings of these friction members do not normally engage the wear plates which they confront, due to the action of the compression springs 71 and 72 against the sliding plates 41 and 42. The hub, and friction members are normally free to rotate within the housing.

Brake application is effected by the operation of a brake actuating assembly 82. This activating assembly includes an annular, elastic, inflatable member 83 which is suitably secured at its inner and outer edges over an annular groove 84 formed in the end plate 14. Annular flanges 85 and 86 positioned over the inner and outer edges, respectively, of said inflatable member are secured by bolts to said end plates so as to effect a sealed engagement of said inflatable member with said plate 14.

End plate 14 is also provided with longitudinally extending bores 87 which open outwardly into the groove 84 at one end and which are internally threaded at their other ends to threadedly receive conduits, not shown, through which a pressurized pneumatic or hydraulic medium can be fed into or bled out of the groove 84, thereby inflating or deflating the inflatable member 83. When the inflatable member 83 is inflated it presses upon an annular heat shield 88 secured to sliding plate 42 so that both sliding plates 42 and 41 are moved against the action of compression springs towards end plate 13 thereby bringing all wear plates into frictional engagement with the linings of the friction members. Release of the pressure of the pneumatic or hydraulic medium will, of course, permit the compression springs to return sliding plates 41 and 42 to their normal positions.

Figure 3:
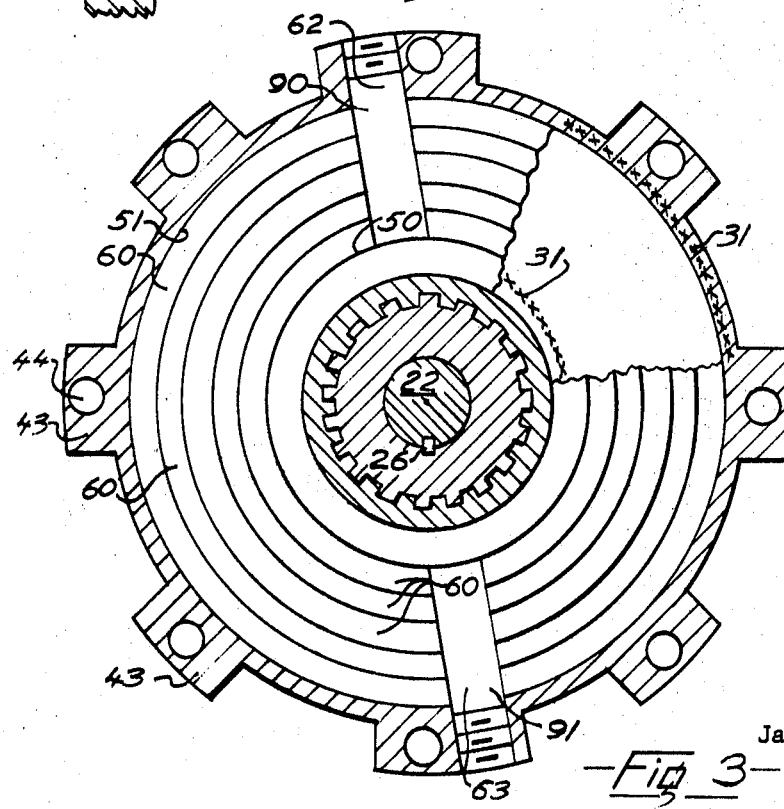
FIG. 3 appearing on page 1 of the drawings is a sectional view of the liquid cooled brake of FIGS. 1 and 2, taken along line 3—3 of FIG. 2.

Referring now to FIGS. 2 and 3 it is to be seen that the fins 60 are formed of lengths of copper tubing arranged in a concentric pattern and substantially fill the entire chamber 57, touching each other and the bottom of said chamber.

The concentric rings of copper tubing terminate short of the radial axes, produced, of bores 62 and 63 so as to provide coolant inlet and outlet passages 90 and 91, respectively, whereby coolant fed through bore 62 will pass into inlet passage 90 then travel through and between the copper tubing to outlet passage 91 thence through bore 63 to the outfeed line.

Figure 4:
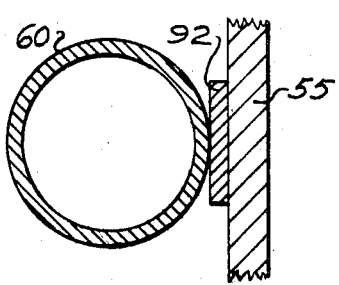
FIG. 4 is an enlarged sectional view showing a portion of the steel wear plate and a fin before connection of the fin thereto.
Figure 5:
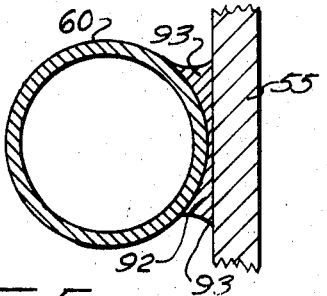
FIG. 5 is a view similar to FIG. 4 showing the fin connected to the wear plate.

FIGS. 4 and 5 illustrate the manner in which the fins 60 are connected to the wear plate 55. In order to obtain an uninterrupted metallic path for the transfer of heat from the wear plate 55 to the coolant the fins 60 have a soldered connection to said wear plate. The solder used for this purpose is a type commonly termed "silver solder" sold under the trade mark "Easy Flo 45" having a composition, by weight of 45 percent silver, 15 percent copper, 16 percent zinc and 24 percent codmium. This type of solder is preferred as it melts and flows at a temperature of 1,145 F. and has a coefficient of thermal conductivity substantially the same as that of copper.

A preferred method of applying the fins 60 to the wear plate 55 is illustrated in FIGS. 4 and 5. The lengths of copper tubing are arranged and clamped in final position on the wear plate 55 over arcuately shaped strips 92 of solder as shown in FIG. 4. The wear plate 55 is then heated in a furnace at about 1,200 F. until the solder melts (approximately 20 minutes) and then cooled. Due to the affinity of this type of solder for both copper and steel the solder will flow over both metals and form concave miniscii 93 as illustrated in FIG. 5 so as to form a relatively wide heat flow path between the wear plate and fins.

The fins 60 and the wear plate 55, due to their intimate soldered connection, become substantially an integral unit, so as to provide an uninterrupted metallic path for the flow of heat from the wear plate 55 to the liquid coolant.

The foregoing description of the arrangement of the copper tubing and the connection thereof to wear plate 55 is illustrative of the connection of the copper tubing to wear plates 30, 56, and 66. With this arrangement, it will be seen that axial pressures applied to the wear plates are transferred from the latter through the fins to the bottoms of the grooves in which the latter lie. Furthermore as the concentric lengths of copper tubing touch each other and the sidewalls of the grooves in which they lie they give each other lateral support, so as to resist deflection under axially directed loads. The steel wear plates are, consequently, provided with substantial axial support against pressures imposed by the friction members. It is therefore possible to utilize wear plates which are much thinner than would be necessary if the wear plates were unsupported. As the rate of flow of heat through any metal corresponds to the length of the flow path the rate of heat flow through a fin-supported wear plate will be correspondingly higher than the rate of heat flow through a thicker unsupported wear plate. Consequently the brake of the present invention can operate much more efficiently than a comparable brake having an unsupported wear plate.

It will also be evident that, in view of the difference in tensile strengths of steel and copper, a wear plate made of steel can be thinner than a wear plate of comparable strength made of copper. The advantages obtained by the thinner steel plate, therefore, offset somewhat the thicker but more thermal conductive copper plate. The wear plate of the brake of the present invention having a steel wear plate and copper fins will, therefore, have substantially the same heat flow characteristics as a comparable wear plate made solely of copper.

Figure 6:
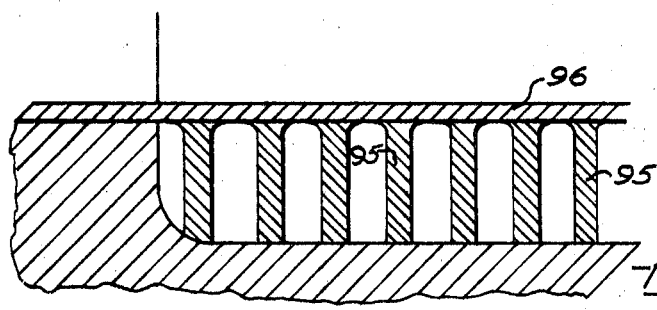
FIG. 6 is a sectional view similar to FIG. 4 and 5 showing another form of fin.

FIG. 6 illustrates partially, another form of fins 95. Fins 95 are, like fins 66, made of copper however fins 95 have a rectangular cross-sectional configuration. Fins 95, like fins 60, are soldered to a steel wear plate 96 which corresponds to wear plate 55, and are arranged to provide axial support for wear plate 96 in the same manner as fins 60 support wear plate 55. Fins 94 can also be arranged in the same concentric pattern as fins 60.

Fins 95 have an advantage over fins 60 in that they do not require lateral support, however, they operate in the same manner as the latter in transferring heat from the wear plate to the liquid coolant.

Throughout the specification and in the claims the wear plates have been referred to as steel wear plates. It is to be understood that the term steel shall include other metals such as cast iron known alloys containing iron or steel which have substantially comparable thermal and strength characteristics.

I claim:

1. A liquid cooled member of a frictional disc brake, said member having a free provided with an annular recess of a substantial radial width defined by a bottom wall and radially inner and outer sidewalls, a wear plate secured to the face of said member and covering said recess so as to provide a wide annular chamber, a set of concentric tubes secured to said wear plate and disposed in said chamber, the outside diameter of said tubes corresponding substantially to the axial depth of said recess so that the tubes are supportingly engaged by said bottom wall of the recess, said concentric tubes contacting one another but being circular in cross section so that annular spaces remain in said chamber exteriorly of the contacting tubes, and liquid coolant inlet and outlet ports provided at diametrically opposite points in said outer sidewall of the recess and communicating with said chamber, said concentric tubes being interrupted along diametrically opposite radial lines to form radial passages in communication with the respective inlet and outlet ports, whereby coolant may flow through both the interior of the interrupted tubes and through said annular spaces of the chamber exteriorly of the tubes.